US007672389B2

(12) United States Patent
Gueguen

(10) Patent No.: US 7,672,389 B2
(45) Date of Patent: Mar. 2, 2010

(54) METHOD FOR TRANSMITTING SYMBOLS THROUGH AT LEAST A COMMUNICATION CHANNEL

(75) Inventor: Arnaud Gueguen, Rennes Cedex 7 (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 876 days.

(21) Appl. No.: 11/435,743

(22) Filed: May 18, 2006

(65) Prior Publication Data

US 2007/0058746 A1 Mar. 15, 2007

(30) Foreign Application Priority Data

May 25, 2005 (EP) ................................ 052911127

(51) Int. Cl.
*H04B 7/02* (2006.01)
(52) U.S. Cl. ..................................................... 375/267
(58) Field of Classification Search ................. 375/260, 375/265, 267, 299, 340, 341, 347; 455/500, 455/103
See application file for complete search history.

(56) References Cited

U.S. PATENT DOCUMENTS

| 7,190,734 | B2* | 3/2007 | Giannakis et al. ........... 375/267 |
| 7,430,243 | B2* | 9/2008 | Giannakis et al. ........... 375/267 |
| 2005/0041751 | A1 | 2/2005 | Nir et al. |
| 2006/0018402 | A1* | 1/2006 | Mehta et al. ................. 375/299 |
| 2006/0146953 | A1* | 7/2006 | Raghothaman et al. ..... 375/267 |

OTHER PUBLICATIONS

Hemanth Sampath, "Linear Precoding and Decoding For Multiple Input Multiple Output (MIMO) Wireless Channels", A Dissertation Submitted to the Department of Electrical Engineering and the Committee on Graduate Studies of Stanford University in Partial Fulfillment of the Requirements for the Degree of Doctor of Philosophy, XP-002245817, Apr. 2001, pp. 1-142 with Introductory Matter.
G. D. Golden, et al., "Detection algorithm and initial laboratory results using V-Blast space-time communication architecture", Electronics Letters, vol. 35, No. 1, pp. 14-16, Jan. 7, 1999.
S. M. Alamouti, "A Simple Transmit Diversity Technique for Wireless Communications", IEEE Journal on Selected Areas in Communications, vol. 16, pp. 1451-1458, Oct. 1998.

* cited by examiner

*Primary Examiner*—Young T. Tse
(74) *Attorney, Agent, or Firm*—Oblon, Spivak, McClelland, Maier & Neustadt, L.L.P.

(57) ABSTRACT

The present invention concerns a method for transmitting symbols through at least a channel in a telecommunication system including at least one transmitter (10) provided with at least two transmitting antennas (Antt 1, Antt 2) and at least one receiver provided with at least one receiving antenna (Antr 1), the method includes an encoding step wherein a vector comprising symbols is multiplied by a coding matrix for producing coded symbols to be transmitted over the at least one communication channel established between the transmitter (10) and the receiver (20), wherein the coding matrix is calculated from an eigenvalue decomposition of a matrix obtained by calculating at least the Kronecker product of the identity matrix of size N, N being the time and/or the frequency dimension of the code and a matrix obtained from an estimated correlation matrix of the response of the channel. The invention concerns also the associated device and a method and device for decoding symbols.

23 Claims, 3 Drawing Sheets

METHOD FOR TRANSMITTING SYMBOLS THROUGH AT LEAST A COMMUNICATION CHANNEL

The present invention relates to a method for transmitting symbols through at least a communication channel in a telecommunication system including at least one transmitter provided with at least two transmitting antennas and at least one receiver provided with at least one receiving antenna, which method includes an encoding step wherein vectors comprising symbols are multiplied by a coding matrix for producing symbols to be transmitted over the at least one communication channel established between the transmitter and the receiver.

More precisely, the present invention is particularly adapted when the transmitter has not a precise knowledge of the communication channels and when the receiver is a Minimum Mean Square Error (MMSE) receiver which has a very good knowledge of the communication channels.

Telecommunication systems in which a plurality of antennas are used at a receiver end and/or at a transmitter end of a wireless link, are called Multiple Input Multiple Output systems (further referred to as MIMO systems). MIMO systems have been shown to offer large transmission capacities compared to those offered by single antenna systems. In particular, MIMO capacity increases linearly with the number of transmitting or receiving antennas, whichever the smallest, for a given Signal-to-Noise Ratio and under favourable uncorrelated channel conditions. Such MIMO techniques can be combined with multi-carrier modulation techniques based on OFDM (standing for Orthogonal Frequency Division Multiplex), whose use in future wireless systems is also considered.

Dedicated coding has been investigated over the past years to properly exploit the possibilities of MIMO. These coding schemes generally span both the space dimension and the time dimension, hence their name of Space Time Codes (ST Codes). They may alternatively span also the frequency dimension eg. several subcarriers in an OFDM system, and are then called Space-Time Frequency Codes (STF Codes).

According to the invention, a STF code is a coding scheme which spans the space and time and/or frequency dimensions. An STF code can be a coding scheme which spans the space and time dimensions or a coding scheme which spans the space and frequency dimensions or a coding scheme which spans the space and time and frequency dimensions.

The purpose of these coding schemes is to use the spatial dimension of MIMO with good performance. The spatial dimension can be used to increase the data rate at a given error rate performance. This is achieved through spatial multiplexing as it is disclosed in the paper of G. D. Golden, G. J. Foschini, R. A. Valenzuela, P. W. Wolniansky, entitled "Detection Algorithm and Initial Laboratory Results using the V-BLAST Space-Time Communication Architecture", published in Electronics Letters, Vol. 35, No. 1, Jan. 7, 1999, pp. 14-15.

The spatial dimension can also be used to improve the error rate performance at a fixed data rate. As example, codes exploit the transmit and receive antennas diversity as it is disclosed in the paper of S. M. Alamouti, entitled "A simple transmitter diversity scheme for wireless communications" published in IEEE J. Selected Areas in Communications, vol. 16, pp. 1451-1458, October 1998.

From a general point of view, STF codes are used to address a variety of cases combining these two possibilities of spatial multiplexing and performance improvement through space diversity.

The most popular type of STF codes referred as space time block codes, as opposed to space-time trellis codes, are represented with concise matrix notations, where the number of possible codewords depends on the matrix size. These codes are ideally decoded by exhaustive search like Maximum Likelihood (ML) decoding, or A Posteriori Probability (APP) decoding, or approximations of it, such as sphere decoding and list sphere decoding.

Especially, they are designed assuming such type of ideal receivers. The main issue is that the decoder complexity is very large as it is exponential with the input size in the case of ML or APP decoding, and polynomial with the input size in the case of sphere decoding or list sphere decoding, which makes their implementation in a mobile receiver difficult to realize, especially at high spectral efficiencies.

On the contrary, MMSE decoding, which is a generic well known type of decoding, has rather low complexity. It is a very good candidate for a practical implementation.

Besides, the existing STF block codes are generally designed assuming perfect transmit de-correlation, which is neither the case in reality where residual correlation exists between the transmit antennas on one side and receive antenna or antennas on the other side. The residual correlation is due to the antennas collocation and due to propagation conditions.

The present invention proposes a STF Code design or a STF pre-coding design under more realistic assumptions of residual and known transmit correlation and assuming the use of MMSE decoder at the receiver side.

To that end, the present invention concerns a method for transmitting symbols through at least a channel in a telecommunication system including at least one transmitter provided with at least two transmitting antennas and at least one receiver provided with at least one receiving antenna, the method includes an encoding step wherein a vector comprising symbols is multiplied by a coding matrix for producing coded symbols to be transmitted over the at least one communication channel established between the transmitter and the receiver, characterised in that the coding matrix is calculated from an eigenvalue decomposition of a matrix obtained by calculating at least the Kronecker product of the identity matrix of size N, N being the time and/or the frequency dimension of the code and a matrix obtained from an estimated correlation matrix of the response of the channel.

According to still another aspect, the present invention concerns a device for transmitting symbols through at least a channel in a telecommunication system including at least one transmitter provided with at least two transmitting antenna and at least one receiver provided with at least one receiving antennas, the device comprising encoding means wherein a vector comprising symbols is multiplied by a coding matrix for producing coded symbols to be transmitted over the at least one communication channel established between the transmitter and the receiver, characterised in that the device comprises means for calculating the coding matrix from an eigenvalue decomposition of a matrix obtained by calculating at least the Kronecker product of the identity matrix of size N, N being the time and/or the frequency dimension of the code and a matrix obtained from an estimated correlation matrix of the response of the channel.

Thus, through the Kronecker product, the time and/or frequency dimension is included in the channel description. It has space and a time and/or a frequency dimension, which allows to design codes considering jointly these three dimensions or part of these dimensions.

According to a first aspect of the present invention, the coding matrix $\tilde{C}$ is a real matrix calculated from an eigenvalue decomposition of a matrix $\tilde{R}_{TX}^*$ being obtained by calculating the Kronecker product of the identity matrix $I_N$ of size N and the real part $R_{TX}^R$ of the estimated transmit correlation matrix of the response of the channel and by calculating the Kronecker product of the identity matrix $I_N$ of size N and the imaginary part $R_{TX}^I$ of the estimated transmit correlation matrix of the response of the channel.

Thus, through the Kronecker product, the time and/or frequency dimension is included in the channel description, so that the coding solution is a STF code.

According to a particular feature, the matrix $\tilde{R}_{TX}^*$ is equal to.

$$\tilde{R}_{Tx}^* = \begin{pmatrix} I_N \otimes R_{Tx}^R & I_N \otimes R_{Tx}^I \\ -I_N \otimes R_{Tx}^I & I_N \otimes R_{Tx}^R \end{pmatrix},$$

wherein $\otimes$ is the Kronecker product.

According to a particular feature, the eigenvalue decomposition of the matrix $\tilde{R}_{TX}^*$ is equal to $\tilde{U}\tilde{\Lambda}\tilde{U}^t$, wherein $\tilde{U}$ is the matrix of the eigenvectors of the matrix $\tilde{R}_{TX}^*$, $\tilde{U}^t$ is the transpose of the matrix $\tilde{U}$ and $\tilde{\Lambda}$ is a diagonal non negative matrix comprising the eigenvalues of the matrix $\tilde{R}_{TX}^*$, and in that the coding matrix $\tilde{C}$ is obtained by multiplying a matrix $\tilde{U}'$ formed by a part of the columns of the matrix $\tilde{U}$ by a diagonal matrix $\tilde{\Lambda}'$ formed by a part of the diagonal matrix $\tilde{\Lambda}$.

Thus, the performances are improved.

According to a particular feature, the matrix $\tilde{\Lambda}'$ is formed by selecting the 2*Q largest non zero diagonal values of the matrix $\tilde{\Lambda}$, wherein Q is the number of symbols comprised within the vector comprising symbols and the matrix $\tilde{U}'$ comprises the 2*Q columns of the matrix $\tilde{U}$ associated, in the same order, with the 2*Q largest values selected for the matrix $\tilde{\Lambda}'$.

Thus, the performances are improved.

According to a particular feature, the number Q of symbols comprised within the vector comprising symbols is not divisible by the dimension N.

According to a particular feature, the coding matrix $\tilde{C}$ is calculated from a third matrix $V'^t$, the matrix $V'^t$ being the transpose of an orthonormal matrix $V'$ of dimension 2*Q.

According to a particular feature, the matrix $V'$ is obtained from a Discrete Fourier Transform matrix or the matrix $V'$ is an Hadamard matrix of dimension 2*Q when 2*Q is a power of two.

It has to be noted here that, a matrix of dimension Q or 2Q should be understood as a square matrix of dimension Q by Q or 2*Q by 2*Q.

According to a particular feature, the coding matrix $\tilde{C}$ is calculated using the following formula:

$$\tilde{C} = \beta \tilde{U}' \tilde{\Lambda}'^{-1/4} V'^t$$

wherein $\beta = \sqrt{P/Tr(\tilde{\Lambda}'^{-1/2})}$ for a predetermined average transmit power of P.

According to a second aspect of the present invention, the coding matrix is a STF linear pre-coding matrix $C_c$ obtained from $R^*_{TX}$, which is the conjugate matrix of the estimated transmit correlation matrix $R_{TX}$ of the frequency response of the channel.

Thus, through the Kronecker product, the time and/or frequency dimension is included in the channel description.

According to a particular feature, the eigenvalue decomposition of the matrix $I_N \otimes R_{TX}^*$ is equal to $U\Lambda U^H$, wherein U is the matrix of the eigenvectors of the matrix $I_N \otimes R_{TX}^*$, $U^H$ is the conjugate transpose of the matrix U and $\Lambda$ is a diagonal non negative matrix comprising the eigenvalues of the matrix $I_N \otimes R_{TX}^*$, and in that the STF linear pre-coding matrix $C_c$ is obtained by multiplying a matrix $U'$ formed by a part of the columns of the matrix U by the matrix $\Lambda'$ which is a diagonal matrix formed by part of the diagonal elements of the matrix $\Lambda$.

Thus, through the Kronecker product, the time and/or frequency dimension is included in the channel description.

According to a particular feature, the matrix $\Lambda'$ is formed by selecting the Q largest non zero diagonal values of the matrix $\Lambda$, wherein Q is the number of symbols comprised within the vector comprising symbols and the matrix $U'$ comprises the Q columns of the matrix U associated with the Q largest values selected for the matrix $\Lambda'$.

According to a particular feature, the number Q of symbols comprised within the vector comprising symbols is not divisible by the dimension N.

According to a particular feature, the STF linear pre-coding matrix $C_c$ is calculated from a third matrix $V^H$, the matrix $V^H$ being the transpose conjugate of a unitary matrix V of dimension Q.

According to a particular feature, the matrix V is a Discrete Fourier Transform matrix or the matrix V is an Hadamard matrix of dimension Q when Q is a power of two.

According to a particular feature, the STF linear pre-coding matrix is $C_c$ is calculated using the following formula:

$$C_c = \alpha U' \Lambda'^{-1/4} V^H,$$

wherein $\alpha = \sqrt{P/Tr(\Lambda'^{-1/2})}$ and P is a predetermined value of average transmit power.

According to still another aspect, the present invention concerns a method for decoding symbols by a receiver provided with at least one receiving antenna, the symbols being transmitted by at a transmitter provided with at least two transmitting antennas through at least a channel in a telecommunication system, the method including a decoding step wherein a vector comprising received symbols is multiplied by a decoding matrix for producing decoded symbols, characterised in that the decoding matrix is calculated from an eigenvalue decomposition of a matrix obtained by calculating at least the Kronecker product of the identity matrix of size N, N being the time and/or the frequency dimension of the code and a matrix obtained from an estimated correlation matrix of the response of the channel.

According to still another aspect, the present invention concerns a device for decoding symbols being transmitted by one transmitter provided with at least two transmitting antennas through at least a channel in a telecommunication system, the device comprising decoding means wherein a vector comprising received symbols is multiplied by a decoding matrix for producing decoded symbols, characterised in that the device comprises means for calculating a decoding matrix from an eigenvalue decomposition of a matrix obtained by calculating at least the Kronecker product of the identity matrix of size N, N being the time and/or the frequency dimension of the code and a matrix obtained from an estimated correlation matrix of the response of the channel.

According to still another aspect, the present invention concerns a computer program which can be directly loadable into a programmable device, comprising instructions or portions of code for implementing the steps of the method according to the invention, when said computer program is executed on a programmable device. Since the features and advantages relating to the computer program are the same as those set out above relating to the method and device according to the invention, they will not be repeated here.

The characteristics of the invention will emerge more clearly from a reading of the following description of an example embodiment, the said description being produced with reference to the accompanying drawings, among which:

Figure 1:
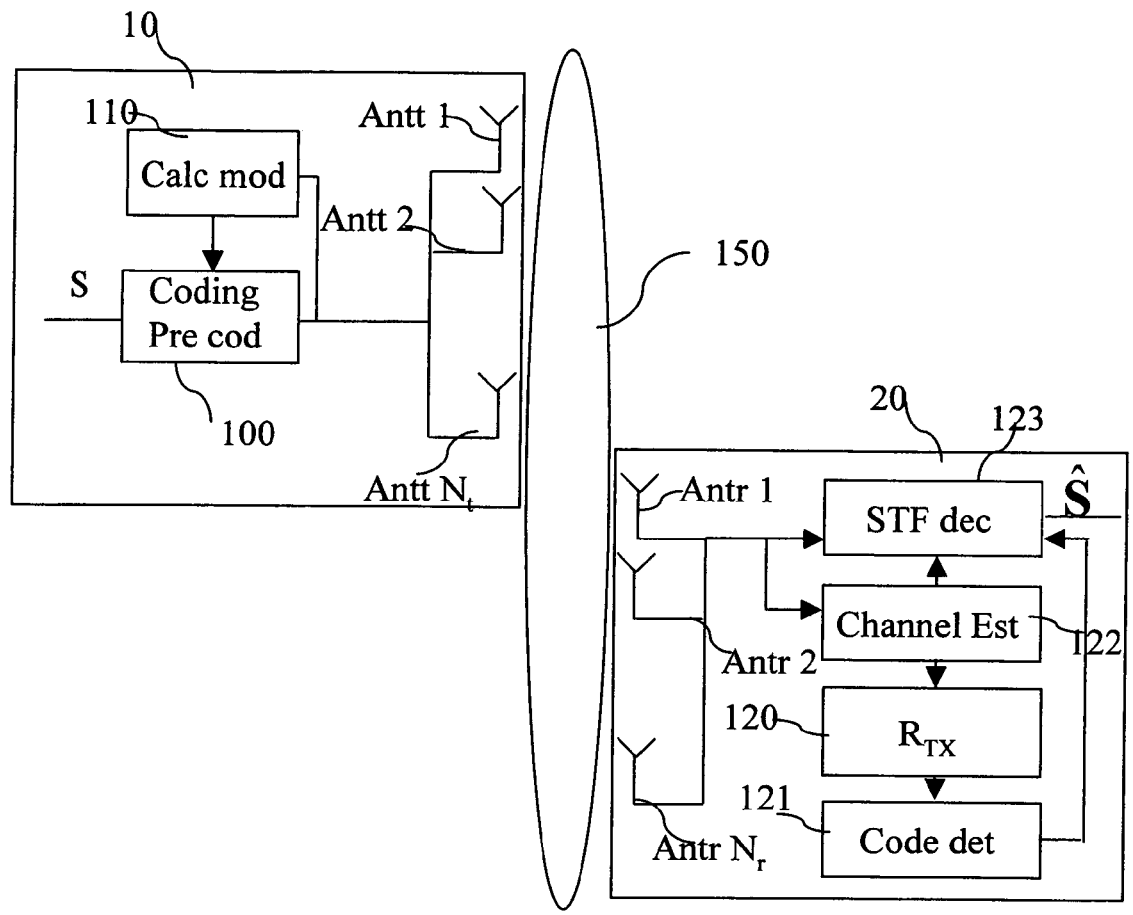
FIG. 1 represents a telecommunication system according to the invention.

The FIG. 1 discloses two communication devices 10 and 20 which exchange information through a wireless MIMO communication channel of the telecommunication network 150.

The communication device 10 is preferably a base station which transfers to the communication device 20, which is preferably a mobile terminal, data through a MIMO downlink transmission channel of a telecommunication network 150.

For the sake of simplicity, only one mobile terminal 20 is shown in FIG. 1. Naturally a more important number of mobile terminals receive or transmit data from or to the base station 10 in the telecommunication network 150 wherein the present invention is used.

The base station 10 has a plurality of $N_t$ antennas respectively noted Antt 1, Antt 2 ... and Antt $N_t$ in the FIG. 1 and the mobile terminal 20 has at least one antenna. As example, the mobile terminal has a plurality of $N_r$ antennas respectively noted Antr 1, Antr 2 to Antr $N_r$ creating then a MIMO downlink transmission channel with $N_t$ transmit antennas and $N_r$ receive antennas.

Preferably and for the sake of simplicity, the transmission of data uses an Orthogonal Frequency Division Multiplexing (OFDM) modulation with $N_c$ modulated sub-carriers, each sub-carrier experiences a MIMO flat fading channel, provided that the OFDM parameters are well chosen in particular with respect to the channel delay spread. The method described in the present invention can be extended to single carrier systems experiencing inter symbol interferences. In that case, the flat fading MIMO channel to be considered is the delay domain equalized channel.

The modulated symbols are transmitted over the space, time and frequency dimensions using a Space-Time-Frequency (STF) block code or a linear STF pre-coder of dimensions $N_t*N_{time}*N_{freq}$, wherein $N_{time}$ is the time dimension of the code in terms of OFDM symbols and $N_{freq}$ is the frequency dimension of the code in terms of subcarriers. Thus, $N=N_{time}*N_{freq}$ equivalently represents the time dimension for a Space Time (ST) code or a linear ST pre-coder, the frequency dimension for a Space Frequency (SF) code or a linear SF pre-coder and a mix of both for a Space Time Frequency (STF) code or a linear STF pre-coder. As it has been already mentioned, STF, ST, SF codes are considered in the present invention as STF codes.

It has to be noted here that if $N_{freq}=1$, N refers to the particular case of Space Time coding and if $N_{time}=1$, N designates the particular case of Space Frequency coding.

The mobile station 20 implements, according to the invention, a Minimum Mean Square Error receiver which estimates the signal encoded by the STF code according to a first aspect of the invention, or a Minimum Mean Square Error receiver which estimates the signal pre-encoded by the linear STF pre-coder at the base station 10 according to the second aspect of the invention.

The mobile station 20 comprises a channel estimation module 122 that estimates the instantaneous channel response used by the MMSE receiver. The mobile station 20 comprises also a correlation matrix estimator 120 which estimates, from several realisations of the instantaneous channel response used by the MMSE receiver, a correlation matrix of the response of the channel noted $R_{TX}$.

More precisely, the correlation matrix of the response of the channel $R_{TX}$ is an estimation of the transmit correlation matrix of the MIMO channel of the telecommunication network 150.

The transmit correlation matrix $R_{TX}$ of the MIMO channel of the telecommunication network 150 is transmitted by the mobile station 20 to the base station 10 through an uplink MIMO channel of the telecommunication network 150.

The mobile station 20 comprises also a code determination module 121 which determines the code used by the base station 10 according to the correlation matrix $R_{TX}$ of the MIMO channel of the telecommunication network 150.

The mobile station 20 needs also to know at least a part of the STF coder or of the linear STF pre-coder used by the base station 10 in order to perform the decoding. The mobile station 20 computes the decoding matrix to be used as the base station 10 computes the coding matrix to be used from the knowledge of the estimated correlation matrix $R_{TX}$.

The computed matrix is transferred to the decoding module 123 of the mobile station 20 in order to decode the received symbols into estimated symbols.

In a variant of realisation, instead of transferring the transmit correlation matrix $R_{TX}$ of the MIMO channel of the telecommunication network 150 to the base station 10, the mobile station 20 transfers the coding matrix elements to the base station 10 through the uplink MIMO channel of the telecommunication network 150.

In another variant of realisation, the base station 10 determines the coding matrix to be used by the base station 10 according to the received correlation matrix and transfers it to the mobile station 20.

The base station 10 comprises at least a coding module 100 and a calculation module 110. The coding module 100 is, according to the first aspect of the invention, a STF coding module, or a linear STF pre-coder, according to the second aspect of the invention.

The STF coding module 100 forms vectors comprising symbols to be transmitted and multiplies each formed vector by a coding matrix for producing coded symbols to be transmitted over the MIMO channel.

The calculation module 110 has a long term or no channel knowledge. It means that the calculation module 110 receives from time to time the estimated correlation matrix $R_{TX}$ from the mobile station 20 and determines a STF coding matrix $\tilde{C}$ according to the first aspect of the invention, or a STF linear pre-coding matrix $C_c$ according the second aspect of the invention, from the received estimated correlation matrix $R_{TX}$, that minimizes the average, with respect to the fast fading process, residual Mean Square Error at the receiver side after MMSE decoding.

The received estimated correlation matrix $R_{TX}$ is representative of the macroscopic environment in the vicinity of the base station. The received estimated correlation matrix $R_{TX}$ is then constant when the channel variations are restricted to the fast fading process. Considering the link between a base station and a mobile station, the estimated correlation matrix $R_{TX}$ is therefore constant during a period that is inversely proportional to the speed of the mobile and the update frequency of the estimated correlation matrix $R_{TX}$ should therefore be set accordingly.

In practice, the update period is large in comparison with the typical elementary transmission duration so that the update of the estimated correlation matrix $R_{TX}$ is inexpensive in term of the required feedback bandwidth and in term of workload for the transmit and the receiving sides.

In a variant of realisation, the calculation module 110, instead of receiving from time to time the estimated correlation matrix $R_{TX}$ from the mobile station 20, receives the coding matrix or the linear pre-coding matrix computed by the mobile station 10 through the uplink channel of the telecommunication network 150.

The calculation module 110 will be described in detail in reference to FIG. 2.

The theoretical bases of the determination of the STF coding matrix $\tilde{C}$ and the STF linear pre-coding matrix $C_c$ are now disclosed.

The following equation describes the discrete time downlink received signal where the signal of one user is transmitted using a STF code:

$$R' = H'(E_c S^R + F_c S^I) + v' \qquad \text{EQ 1}$$

where v' is a $N_r N*1$ vector of independently and identically distributed AWGN complex samples of variance $\sigma^2$.

For the following, the ensemble of real numbers is noted R and the ensemble of complex numbers is noted C.

where R' is a $N_r N*1$ complex vector made of the column vectors $R^i$ of $R \in C^{Nr*N}$ stacked on top of each other, each of size $N_r*1$ and H' is a block diagonal MIMO channel matrix, where each of the N blocks corresponds to a time index for ST codes, or a frequency index for SF codes, or a mixed time and frequency index for STF codes:

$$R' = \begin{pmatrix} R^1 \\ \vdots \\ R^N \end{pmatrix}, \qquad \text{EQ 2}$$

$$H' = \begin{pmatrix} H_1 & \cdots & 0 \\ \vdots & \ddots & \vdots \\ 0 & \cdots & H_N \end{pmatrix}$$

where $H_I \in C^{Nr*Nt}$ is a normalized channel matrix, ie the channel coefficient $H_{ij}$ between a receive antenna i and a transmit antenna j has a variance equal to $E(|H_{ij}|^2)=1$ and is centered. The channels matrices $H_i$ may be more or less correlated for different i, but in any case they are characterised by the same correlation matrix.

where $S \in C^{Q*1}$ is the vector containing the Q modulated symbols, Q being the number of symbols per STF codeword. $S^R$ is the real part Re(S) of S and $S^I$ is the imaginary part Im(S) of S. Each symbol of S has an average energy equal to 1.

The STF code in equation EQ 1 is described with two complex matrices $E_c$ and $F_c$, one encoding the real part of S, the other one the imaginary part. Equivalently, the STF code can be described with two other complex matrices $C_c$ and $D_c$ encoding respectively S and S*. It has to be noted here that S* denotes the conjugate of the matrix S.

where $E_c \in C^{NtN*Q}$, $F_c \in C^{NtN*Q}$ are the code matrices that respectively encode the real part of S and the imaginary part of S. It has to be noted that Ec and Fec fully describe the STF code and describe in the most general manner all block STF codes from spatial multiplexing as disclosed in the paper of G. D. Golden, G. J. Foschini, R. A. Valenzuela, P. W. Wolniansky, entitled "Detection Algorithm and Initial Laboratory Results using the V-BLAST Space-Time Communication Architecture", to true STF codes, such as disclosed in the paper of Alamouti, "A simple transmitter diversity scheme for wireless communications".

This gives the following equation, equivalent to EQ 1:

$$R' = H'(C_c S + D_c S^*) + v' \qquad \text{EQ 3}$$

When $D_c$ is constrained to 0, the resulting STF code is a linear STF pre-coding. Linear STF pre-coding means that the output of the STF pre-encoding process is a linear operation on the input complex vector S. In this case equation EQ 3 can be written as:

$$R' = H'C_c S + v'$$

In the case of true STF coding, no restriction is put on the coding matrices $E_c$ and $F_c$. It is convenient to rewrite EQ 1 with a linear form:

$$R' = H'[E_c \quad F_c]\begin{bmatrix} S^R \\ S^I \end{bmatrix} + v' \qquad \text{EQ 4}$$

Rewriting EQ 4 with real matrices, we obtain the equivalent equation:

$$\underbrace{\begin{bmatrix} R'^R \\ R'^I \end{bmatrix}}_{\tilde{R}} = \underbrace{\begin{bmatrix} H'^R & -H'^I \\ H'^I & H'^R \end{bmatrix}}_{\tilde{H}} \underbrace{\begin{bmatrix} E_c^R & F_c^R \\ E_c^I & F_c^I \end{bmatrix}}_{\tilde{C}} \underbrace{\begin{bmatrix} S^R \\ S^I \end{bmatrix}}_{\tilde{S}} + \underbrace{\begin{bmatrix} v'^R \\ v'^I \end{bmatrix}}_{\tilde{v}}$$

where $\tilde{R} \in R^{2NrN*1}$, $\tilde{H} \in R^{2NrN*2NtN}$, $\tilde{C} \in R^{2NtN*2Q}$, $\tilde{S} \in R^{2Q*1}$, $\tilde{v} \in R^{2NrN*1}$.

The MIMO transmission channel of the telecommunication network is assumed to be flat fading, it means that the discrete time channel response between each pair of transmit and receive antennas is modeled as a complex coefficient $(H)_{ij}$, where i is the receive antenna index and j is the transmit antenna index. Such hypothesis is well suited to OFDM modulation since each subcarrier indeed experiences flat fading, the channel coefficients are equal to the channel frequency response at the subcarrier frequency, given by the corresponding sample of the FFT of the channel impulse response between the pair of antennas.

We denote $R_{TX}$ the correlation matrix at the transmitter side and B its square root, so that $B^H B = R_{TX}$ and thus the channel matrix is modeled as:

$$H(t,f) = G(t,f)B^* \qquad \text{EQ 5}$$

where G(t,f) is a normalized independently and identically distributed complex centered Gaussian matrix. The distribution of each element of G(t,f) is $(1/\sqrt{2})(N(0,1)+jN(0,1))$.

It has to be noted here that in order to simplify the notations the indexes t and f of H and G are dropped.

Combining EQ 5 and EQ 2, H' becomes:

$$H' = \begin{pmatrix} G_1 B^* & \cdots & 0 \\ \vdots & \ddots & \vdots \\ 0 & \cdots & G_N B^* \end{pmatrix} \quad \text{EQ 6}$$

The independently and identically distributed complex centered Gaussian matrices $G_i$ may be equal or more or less correlated for different indexes i.

It has to be noted here that the receiver 20 is assumed to have a perfect instantaneous knowledge of the channel of the telecommunication network 150, which is, as example, commonly implemented by using appropriate pilot symbols.

Considering that the receiver 20 comprises an MMSE STF detector which has a perfect instantaneous channel knowledge, the STF coding module 100 or the linear STF precoding module 100 uses a STF code that minimizes the residual Mean Square Error at the receiver side after detection, averaged over the fast fading process, i.e $G_t$ in EQ 6.

According to the first aspect of the invention, we will now focus on the basic principle of the characterisation of the STF coding matrix for STF code.

As already disclosed, the received signal can be expressed with a linear equation provided that the processing of the real and imaginary parts are made separately.

$$\underbrace{\begin{bmatrix} R'^R \\ R'^I \end{bmatrix}}_{\tilde{R}} = \underbrace{\begin{bmatrix} H'^R & -H'^I \\ H'^I & H'^R \end{bmatrix}}_{\tilde{H}} \underbrace{\begin{bmatrix} E_c^R & F_c^R \\ E_c^I & F_c^I \end{bmatrix}}_{\tilde{C}} \underbrace{\begin{bmatrix} S^R \\ S^I \end{bmatrix}}_{\tilde{S}} + \underbrace{\begin{bmatrix} v'^R \\ v'^I \end{bmatrix}}_{\tilde{v}}$$

The STF coding matrix $\tilde{C}$ is found so as to minimize the average residual MSE after MMSE detection, under the transmit power constraint $\mathrm{Tr}(\tilde{C}\tilde{C}^t)=P$. At high signal to noise ratio, i.e $94^2$ is small. $\tilde{C}$ is found as.

$$\tilde{C} = \beta \tilde{U} \begin{pmatrix} \tilde{\Lambda}_{2Q}^{\prime -1/4} \\ 0 \end{pmatrix} V'^t$$

where $\tilde{\Lambda}'_{2Q}$ is a diagonal matrix made of the 2Q strongest eigenvalues of $\tilde{B}^t\tilde{B}$ and $\tilde{U}$ is made of the related 2Q eigenvectors followed by arbitrary 2NtN−2Q column vectors.

$\tilde{B}$ is given by $\tilde{B} = \begin{pmatrix} I_N \otimes B^R & I_N \otimes B^I \\ -I_N \otimes B^I & I_N \otimes B^R \end{pmatrix}$ where B is a square root of the transmit correlation matrix: $B^H B = R_{Tx}$, $B^R = \mathrm{Re}(B)$ and $B^I = \mathrm{Im}(B)$. The constant $\beta$ serves to satisfy the transmit power constraint. For instance, $\beta$ is given by: $\beta = \sqrt{P/\mathrm{Tr}(\tilde{\Lambda}'_{2Q}{}^{-1/2})}$ for a power constraint of P.

Similarly, $\tilde{C}$ can be written as:

$\tilde{C} = \beta \tilde{U}' \tilde{\Lambda}'_{2Q}{}^{-1/4} V'^t$ where $\tilde{U}'$ is a $2N_t N \ast 2Q$ matrix made of the first 2Q columns of $\tilde{U}$.

It has to be noted here that all the involved matrices here are real matrices and that V' is only required to be an orthonormal 2Q*2Q matrix.

According to a preferred mode of realisation, the matrix $V'^t$ is a transpose matrix of a matrix V' which can be refined so as to maximize the minimum average residual SINR per detected real dimension after MMSE equalization. V' can be chosen as a Hadamard matrix of dimension 2Q when 2Q is a power of 2.

$V'^t$ can also be obtained from a Discrete Fourier Transform matrix F using the following formula:

$$V'^t = \begin{pmatrix} F^{Rt} & -F^{It} \\ F^{It} & F^{Rt} \end{pmatrix}$$

where $F^{Rt}$ is the transpose of the real part of the matrix F and $F^{It}$ is the transpose of the imaginary part of the matrix F.

According to the second aspect of the invention, we will now focus on the basic principle of the characterisation of the STF linear pre-coding matrix.

Starting with equation EQ 3 where Dc is set to zero, we consider that the receiver implements an MMSE STF detector, we assume that perfect instantaneous channel knowledge is available at the receiver side.

The coding matrix $C_c$ is found so as to minimize the average residual MSE after MMSE detection, under the transmit power constraint $\mathrm{Tr}(C_c C_c^t) = P$.

We use the Eigen Value Decomposition (EVD) of $R_{Tx}^*$:

$R_{Tx}^* = U\Lambda U^H$.

The EVD of $I_N \hat{x} R_{Tx}^*$ is then given by:

$$I_N \otimes R_{Tx}^* = \underbrace{(I_N \otimes U)}_{U'} \underbrace{(I_N \otimes \Lambda)}_{\Lambda'} \underbrace{(I_N \otimes U^H)}_{U'^H}$$

At high signal to noise ratio, $C_c$ is found as:

$$C_c = \alpha U' \begin{pmatrix} \Lambda'^{-1/4}_Q \\ 0 \end{pmatrix} V^H \quad \text{EQ 7}$$

where $\Lambda'_Q$ is a diagonal Q*Q matrix made of the Q largest eigenvalues of $I_N \otimes \Lambda$, the first Q column vectors of U' are made of the Q column vectors of $I_N \otimes U$ associated with the eigenvalues of $79_Q'$. The remaining $N_t N - Q$ column vectors of U' have no importance as they are not used. So their can be set to zero or to any arbitrary value.

$\alpha$ is a normalization coefficient that is used to satisfy the transmit power constraint. For instance $\alpha = \sqrt{P/\mathrm{Tr}(\Lambda'_Q{}^{-1/2})}$ for a constraint of transmit power P.

Similarly, $C_c$ can be written as $C_c = \alpha U'' \Lambda'_Q{}^{-1/4} V^H$

Where U'' is a $N_t N \ast Q$ matrix made of the first Q columns of U'.

In EQ 7, U', $\alpha$ and $\Lambda'_Q$ are fully defined, V is only required to be unitary. However, whereas any unitary matrix V gives the same average value of the MSE with respect to the fast fading process, the choice of V influences the resulting Bit Error Rate (BER).

According to a preferred embodiment, V can be determined so as to maximize the minimum average signal to noise plus interference ratio denoted SINR per dimension of the detected signal. Discrete Fourier matrices and Hadamard matrices are found to be local optima of this problem.

Thus, V can be chosen, according to a particular feature as a Discrete Fourier Transform or a Hadamard matrix of dimension Q.

In the case of Hadamard matrices, Q needs to be a power of two.

According to a variant, V can be chosen as a unitary linear precoding matrix such as described by S. Galliou, J. C. Belfiore in "Une nouvelle famille de codes espace-temps linéaires, de rendement et de diversité maximaux", Proc. Propagation Electromagnétique dans l'Atmosphère du Décamétrique à l'Angström, Rennes 13, 14, 15 Mars 2002, pp. 117-118 or by N. Gresset, J. Boutros, L. Brunel in "Optimal linear precoding for BICM over MIMO channels," Proc. of the IEEE International Symposium on Information Theory, Chicago, p. 66, June 2004.

Figure 2:
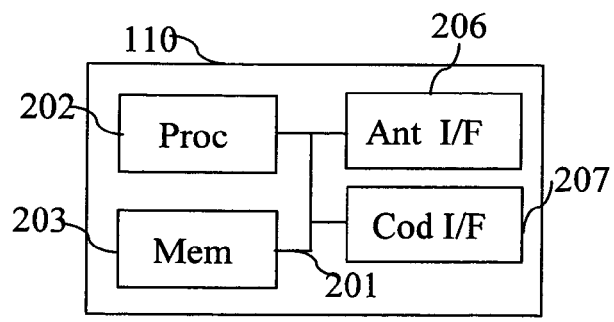
FIG. 2 represents the calculation module which calculates the STF Code according to the first aspect of the invention or the linear STF pre-coding matrix according to the second aspect of the invention.

FIG. 2 represents the calculation module which calculates the STF Code according to the first aspect of the invention or the STF linear pre-coding matrix according to the second aspect of the invention.

Figure 3:
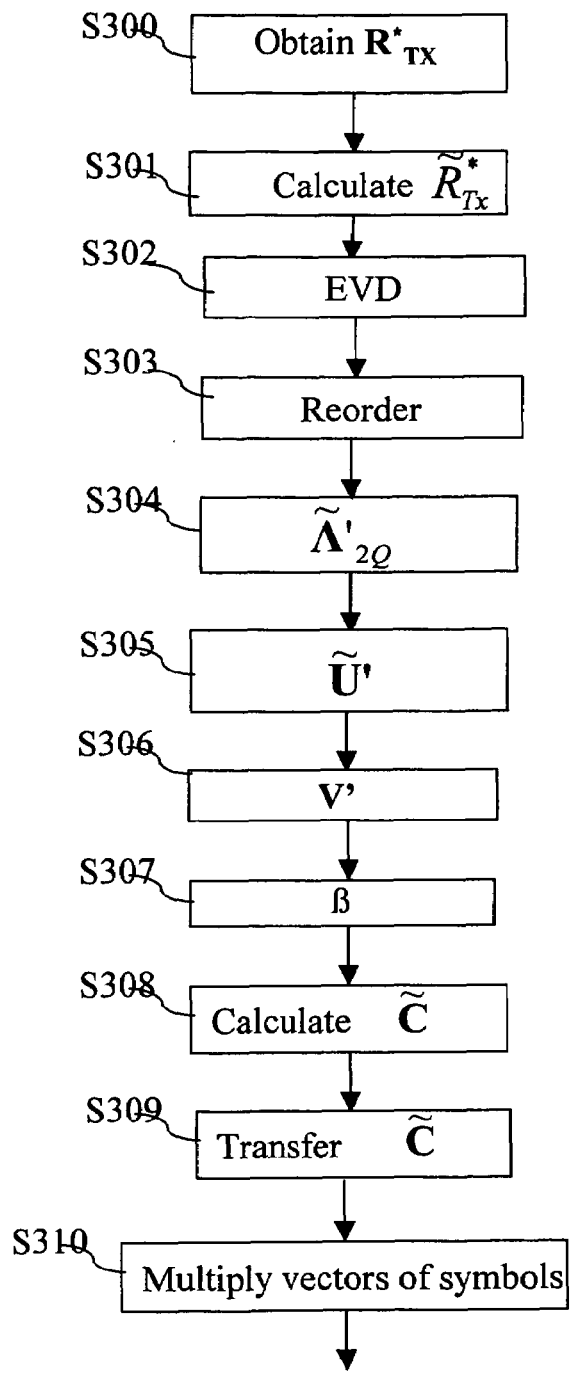
FIG. 3 represents the algorithm executed by the calculation module according the first aspect of the invention.

The calculation module 110 has an architecture based on components connected together by a bus 201 and a processor 202 controlled by a program as disclosed in FIG. 3. The calculation module 110 can be integrated in one or several integrated circuits.

The calculation module 110 comprises memory means 203 made by at least one random access memory and a non-volatile memory.

The bus 201 links the processor 202 to the memory means 203, the interface ANT I/F 206 which receives the estimated correlation matrix $R_{TX}$ or the conjugate of the estimated correlation matrix $R^*_{TX}$ from the mobile station 20 and the interface cod I/F 207 which enables the transfer to the STF coding module 100 of the calculated STF linear pre-coding matrix $C_c$ or the STF coding matrix $\tilde{C}$ according to the obtained correlation matrix $R_{TX}$.

The random access memory contains registers intended to receive variables, digital data and intermediate processing values. The non-volatile memory stores the program which enables the module and, in particular, the processor 202, to operate. The processor 202 controls the operation of the principal components of the calculation module 110.

FIG. 3 represents the algorithm executed by the calculation module according the first aspect of the invention.

The code of this flow chart is for example stored in a non volatile memory of the memory 203 of the calculation module 110. Regularly, at a frequency that depends on the mobile station maximum Doppler Frequency, which typically corresponds to a refreshing period of a few hundreds of milliseconds at the carrier frequency of 5 GHz and a mobile station speed of 3 meters per second, the calculation module 110 executes the instructions associated to the algorithm described in the FIG. 3.

At step S300 the calculation module 110 obtains the estimated correlation matrix $R_{TX}$. The estimated correlation matrix $R_{TX}$, is received through the uplink MIMO channel of the telecommunication network 150 and from the correlation matrix estimator 120 of the mobile station 20. The estimated correlation matrix is then stored in the random access memory of the memory 203.

It has to be noted here that the correlation matrix $R_{TX}$ can be also estimated by the calculation module 110 when the uplink channels are considered to have long term statistics equal to the long term statistics of the downlink channels.

At next step S301, the processor 202 calculates the matrix $\tilde{R}_{TX}^*$ using the following formula:

$$\tilde{R}_{TX}^* = \begin{pmatrix} I_N \otimes R_{TX}^R & I_N \otimes R_{TX}^I \\ -I_N \otimes R_{TX}^I & I_N \otimes R_{TX}^R \end{pmatrix}$$

where $R_{TX}^R$ is the real part of the matrix $R_{TX}$ and $R_{TX}^I$ is the imaginary part of the matrix $R_{TX}$.

Through the Kronecker product, the time and/or frequency dimension is included in the channel description, so that the coding solution is a STF code. It has space and a time and/or a frequency dimension.

At next step S302 the processor 202 executes an eigenvalue decomposition noted EVD of the matrix $\tilde{R}_{TX}^*$. The matrix $\tilde{R}_{TX}^*$ is then decomposed in $\tilde{R}_{TX}^* = \tilde{U}\tilde{\Lambda}\tilde{U}'$ wherein $\tilde{U}$ is the matrix of the eigenvectors of the matrix $\tilde{R}_{TX}^*$, $\tilde{U}'$ is the transpose of the matrix $\tilde{U}$ and $\tilde{\Lambda}$ is a non negative diagonal matrix comprising the eigenvalues of the matrix $\tilde{R}_{TX}^*$.

At next step S303, the processor 203 reorders the eigenvalues of the matrix $\tilde{\Lambda}$ according to a predetermined criterion, preferably from the highest value to the lowest one. The processor 202 reorders the column vectors of $\tilde{U}$ accordingly and the line vectors of $\tilde{U}'$ accordingly.

At next step S304, the processor 202 forms a matrix $\tilde{\Lambda}'$ which is a diagonal matrix made of the 2Q strongest eigenvalues of $\tilde{R}_{TX}^*$.

At next step S305, the processor 202 forms a matrix $\tilde{U}'$ which is made of the related 2Q eigenvectors of the strongest eigenvalues followed by arbitrary $2N_rN-2Q$ column vectors.

At next step S306, the processor 202 obtains the matrix V' as defined previously.

At next step S307, the processor 202 calculates the factor β using the following formula:

$$\beta = \sqrt{P/Tr(\tilde{\Lambda}'_{2Q}{}^{-1/2})}$$

where P is the desired average transmit power.

At next step S308, the processor 202 calculates the STF coding matrix $\tilde{C}$ using the following formula:

$$\tilde{C} = \beta \tilde{U}' \tilde{\Lambda}'^{-1/4} V'^T$$

At next step S309, the STF coding matrix $\tilde{C}$ is transferred to the STF coding module 100.

A next step S310, vectors of a dimension of 2Q are formed. Each vector comprises the real parts and the imaginary parts of the symbols to be transmitted which are stacked on top of each other. Each formed vector is multiplied by the STF coding matrix $\tilde{C}$ for producing coded symbols to be transferred.

It has to be noted here that, according to a particular feature, the code determination module 121 of the mobile station 20 executes the present algorithm in a similar way as the one disclosed here in order to calculate the STF coding matrix Caused by the decoding module 123 of the mobile station 20. In such case, the received symbols a group into vectors of dimension 2Q which are each multiplied by the STF decoding matrix calculated from an eigenvalue decomposition of a matrix obtained by calculating at least the Kronecker product of the identity matrix of size N for producing estimated symbols.

It has to be noted here that, according to a variant, the STF coding matrix $\tilde{C}$ is transferred to the code determination module 121 of the mobile station 20.

According to a particular feature, $\tilde{C}$ is computed by the code determination module 121 and transferred by the mobile station 20 to the base station 10.

Figure 4:
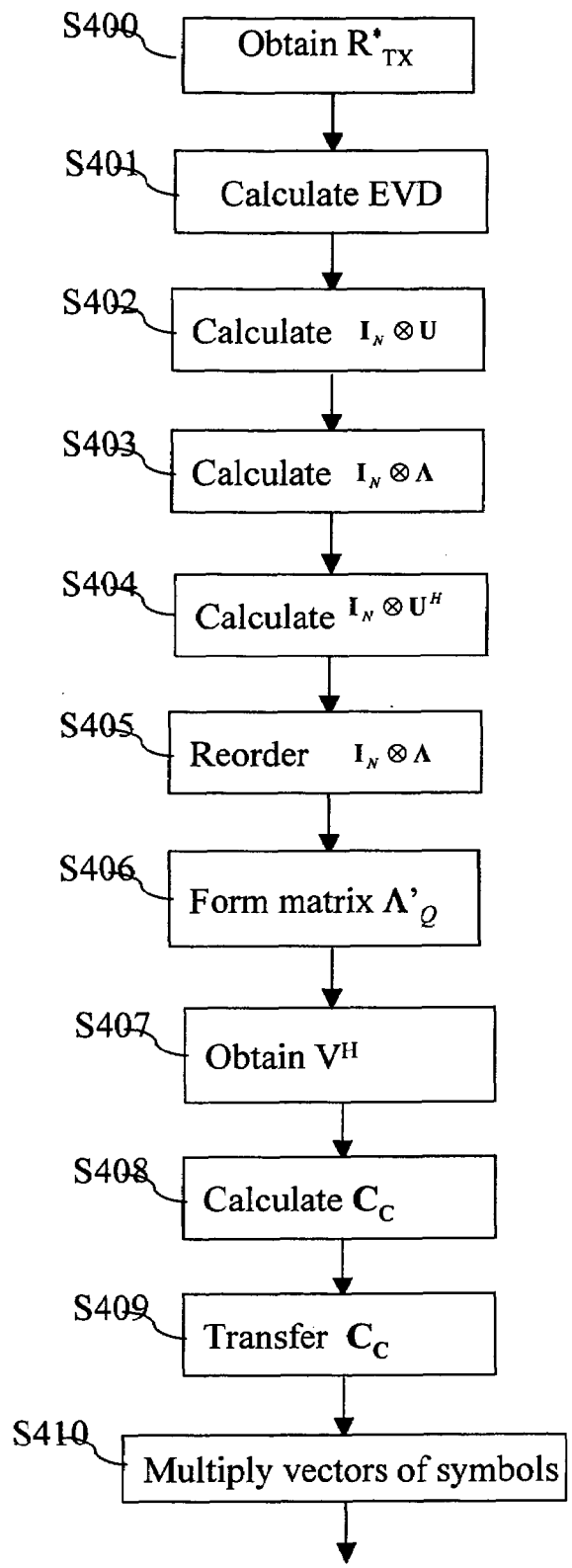
FIG. 4 represents the algorithm executed by the calculation module according the second aspect of the invention.

FIG. 4 represents the algorithm executed by the calculation module according the second aspect of the invention.

The code of this flow chart is for example stored in a non volatile memory of the memory 203 of the calculation module 110. Regularly, at a frequency that depends on the mobile station maximum Doppler Frequency, the calculation module 110 executes the instructions associated to the algorithm described in the FIG. 4.

At step S400 the calculation module 110 obtains the conjugate of the estimated correlation matrix $\tilde{R}^*_{TX}$. The estimated correlation matrix $R_{TX}$ is received through the uplink MIMO channel of the telecommunication network 150 and from the correlation matrix estimator 120 of the mobile station 20. The estimated correlation matrix is then stored in the random access memory of the memory 203.

It has to be noted here that the conjugate of the correlation matrix $\tilde{R}^*_{TX}$ can be also estimated by the calculation module 110 when the uplink channels are considered to have long term statistics equal to the long term statistics of the downlink channels.

At next step S401, the processor 202 calculates an eigenvalue decomposition noted EVD of the conjugate of the estimated correlation matrix $\tilde{R}^*_{TX}$. $\tilde{R}^*_{TX}$ is then decomposed in $\tilde{R}_{TX}^* = U\Lambda U^H$.

Wherein U is the matrix of the eigenvectors of the conjugate of the estimated correlation matrix $\tilde{R}_{TX}^*$, $U^H$ is the conjugate transpose of the matrix U and $\Lambda$ is the matrix of the eigenvalues of the conjugate of the estimated correlation matrix $\tilde{R}^*_{TX}$.

At next step S402, the processor 202 calculates the Kronecker product of the identity Matrix $I_N$ of dimension N and the matrix U. The resulting matrix is noted the matrix U'.

At next step S403, the processor 202 calculates the Kronecker product of the identity Matrix $I_N$ and the matrix $\Lambda$. The resulting matrix is called the matrix $\Lambda'$ which is a diagonal matrix comprising the eigenvalues.

At next step S404, the processor 202 calculates the Kronecker product of the identity Matrix $I_N$ and the matrix $U^H$. The resulting matrix is called the matrix $U'^H$.

Through the Kronecker product, the time and/or frequency dimension is included in the channel description, so that the coding solution is a true linear STF pre-coding. It has space and a time and/or a frequency dimension.

At next step S405, the processor 202 reorders the eigenvalues of the matrix $\Lambda'$ according to a predetermined criterion, preferably from the highest values to the lowest one. The processor 202 reorders the column vectors of U' accordingly and the line vectors of $U'^H$ accordingly.

At next step S406, the processor 202 forms a matrix $\Lambda'_Q$ which is a diagonal matrix made of the Q strongest eigenvalues of $\Lambda'$.

At next step S407, the processor 202 obtains the matrix $V^H$ as defined previously.

At next step S408, the processor 202 calculates the STF linear pre-coding matrix $C_c$ using the following formula:

$$C_c = \alpha U' \Lambda'^{-1/4} V^H,$$

wherein $\alpha = \sqrt{P/Tr(\Lambda'^{-1/2})}$ and P is a predetermined value of power.

At next step S409, the STF linear pre-coding matrix $C_c$ is transferred to the STF pre-coding module 100.

The symbols to be transmitted are grouped into vectors of Q complex elements. Each vector of dimension Q is multiplied by the STF coding matrix $C_c$ at step S410.

It has to be noted here that the code determination module 121 of the mobile station 20 executes the present algorithm in a similar way as the one disclosed here in order to calculate the STF linear pre-coding matrix $C_c$ used by the decoding module 123 of the mobile station 20. In such case, the received symbols a group into symbols of dimension Q which are each multiplied by the STF linear decoding matrix calculated from an eigenvalue decomposition of a matrix obtained by calculating at least the Kronecker product of the identity matrix of size N for producing estimated symbols.

According to a particular feature, $C_c$ is computed by the code determination module 121 and transferred by the mobile station 20 to the base station 10.

It has to be noted here that, according to a variant, the STF linear pre-coding matrix $C_c$ is transferred to the code determination module 121 of the mobile station 20.

Naturally, many modifications can be made to the embodiments of the invention described above without departing from the scope of the present invention.

The invention claimed is:

1. A method for transmitting symbols through at least one channel in a telecommunication system including at least one transmitter provided with at least two transmitting antennas and at least one receiver provided with at least one receiving antenna, the method comprising:

obtaining an intermediate matrix by calculating at least a Kronecker product of an identity matrix of size N, where the size N is a time and/or a frequency dimension of a code, and an estimated correlation matrix of a response of the at least one channel established between the transmitter and the receiver;

calculating a coding matrix from an eigenvalue decomposition of the intermediate matrix; and encoding according to the code to produce coded symbols to be transmitted over the at least one channel established between the transmitter and the receiver by multiplying a vector comprising the symbols by the coding matrix.

2. The method according to claim 1, wherein the coding matrix $\tilde{C}$ is calculated from the eigenvalue decomposition of the intermediate matrix $\tilde{R}^*_{TX}$ being obtained by calculating the Kronecker product of the identity matrix $I_N$ of size N and the real part $R_{TX}^R$ of the estimated correlation matrix of the response of the at least one channel and by calculating the Kronecker product of the identity matrix $I_N$ of size N and the imaginary part $R_{TX}^I$ of the estimated correlation matrix of the response of the at least one channel.

3. The method according to claim 2, wherein the intermediate matrix $\tilde{R}^*_{TX}$ is equal to:

$$\tilde{R}^*_{Tx} = \begin{pmatrix} I_N \otimes R^R_{Tx} & I_N \otimes R^I_{Tx} \\ -I_N \otimes R^I_{Tx} & I_N \otimes R^R_{Tx} \end{pmatrix},$$

wherein $\otimes$ is the Kronecker product.

4. The method according to claim 3, wherein the eigenvalue decomposition of the matrix $\tilde{R}^*_{TX}$ is equal to $\tilde{U}\tilde{\Lambda}\tilde{U}'$, wherein $\tilde{U}$ is a matrix of eigenvectors of the matrix $\tilde{R}^*_{TX}$, $\tilde{U}'$ is a transpose of the matrix $\tilde{U}$ and $\tilde{\Lambda}$ is a diagonal non negative matrix comprising eigenvalues of the intermediate matrix $\tilde{R}^*_{TX}$, and in that the coding matrix $\tilde{C}$ is obtained by multiplying the matrix $\tilde{U}'$ formed by a part of the columns of the matrix $\tilde{U}$ by a diagonal matrix $\tilde{\Lambda}'$ formed by a part of the diagonal matrix $\tilde{\Lambda}$.

5. The method according to claim 4, wherein the matrix $\tilde{\Lambda}'$ is formed by selecting the 2*Q largest non zero diagonal values of the matrix $\tilde{\Lambda}$, wherein Q is a number of symbols comprised within the vector comprising the symbols and the matrix $\tilde{U}'$ comprises the 2*Q columns of the matrix $\tilde{U}$ associated, in the same order, with the 2*Q largest values selected from the matrix $\tilde{\Lambda}'$.

6. The method according to claim 5, wherein the number Q of symbols within the vector comprising the symbols is not divisible by the size N'.

7. The method according to claim 6, wherein the coding matrix $\tilde{C}$ is calculated from a matrix $V'^t$, the matrix $V'^t$ being the transpose of an orthonormal matrix V' of dimension 2*Q.

8. The method according to claim 7, wherein the matrix V' is obtained from a Discrete Fourier Transform matrix.

9. The method according to claim 7, wherein the matrix V' is an Hadamard matrix of dimension 2*Q when 2*Q is a power of two.

10. The method according to claim 7, wherein the coding matrix $\tilde{C}$ is calculated using the following formula:

$$\tilde{C}=\beta \tilde{U}' \tilde{\Lambda}'^{-1/4} V'^t$$

wherein $\beta=\sqrt{P/Tr(\tilde{\Lambda}'^{-1/2})}$ for a predetermined average transmit power of P, where Tr is a trace operation.

11. The method according to claim 1, wherein the coding matrix is a Space-Time Frequency (STF) linear pre-coding matrix $C_c$ and the intermediate matrix obtained from the estimated correlation matrix of the response of the at least one channel $R^*_{TX}$ is the conjugate matrix of the estimated correlation matrix $R_{TX}$ of the frequency response of the channel.

12. The method according to claim 11, wherein the eigenvalue decomposition of a matrix $I_N \otimes R^*_{TX}$ is equal to $U\Lambda U^H$, wherein $I_N$ is the identity matrix, $\otimes$ is the Kronecker product, U is a matrix of eigenvectors of the matrix $I_N \otimes R^*_{TX}$, $U^H$ is a conjugate transpose of the matrix U and $\Lambda$ is a non negative diagonal matrix comprising eigenvalues of the matrix $I_N \otimes R^*_{TX}$, and in that the STF linear pre-coding matrix $C_c$ is obtained by multiplying a matrix U' formed by a part of the columns of the matrix U by the matrix $\Lambda'$ which is a diagonal matrix formed by part of the diagonal elements of the matrix $\Lambda$.

13. The method according to claim 12, wherein the matrix $\Lambda'$ is formed by selecting the Q largest non zero diagonal values of the matrix $\Lambda$, wherein Q is a number of symbols comprised within the vector the comprising symbols and the matrix U' comprises the Q columns of the matrix U associated with the Q largest values selected for the matrix $\Lambda'$.

14. The method according to claim 13, wherein the number Q of symbols within the vector comprising the symbols is not divisible by the size N.

15. The method according to claim 14, wherein the STF linear pre-coding matrix $C_c$ is calculated from a matrix $V^H$, the matrix $V^H$ being the transpose conjugate of a unitary matrix V of dimension Q.

16. The method according to claim 15, wherein the unitary matrix V is a Discrete Fourier Transform matrix.

17. The method according to claim 15, wherein the matrix V is an Hadamard matrix of dimension Q when Q is a power of two.

18. The method according to claim 15, wherein the STF linear pre-coding matrix $C_c$ is calculated using the following formula:

$$C_c = \alpha U' \Lambda'^{-1/4} V^H,$$

wherein $\alpha = \sqrt{P/Tr(\Lambda'^{-1/2})}$, Tr is a trace operation and P is a predetermined value of average transmit power.

19. A device for transmitting symbols through at least one channel in a telecommunication system including at least one transmitter provided with at least two transmitting antennas and at least one receiver provided with at least one receiving antenna, the device comprising:
an obtaining section configured to obtain an intermediate matrix by calculating at least a Kronecker product of an identity matrix of size N, where the size N is a time and/or a frequency dimension of a code, and an estimated correlation matrix of a response of the at least one channel established between the transmitter and the receiver;
a calculating section configured to calculate a coding matrix from an eigenvalue decomposition of the intermediate matrix; and
an encoding section configured to produce coded symbols according to the code to be transmitted over the at least one channel established between the transmitter and the receiver by multiplying a vector comprising the symbols by the coding matrix.

20. A method for decoding symbols received by a receiver provided with at least one receiving antenna, the symbols being transmitted by a transmitter provided with at least two transmitting antennas through at least one channel in a telecommunication system, the method comprising:
obtaining an intermediate matrix by calculating at least a Kronecker product of an identity matrix of size N, where the size N is a time and/or a frequency dimension of a code, and an estimated correlation matrix of a response of the at least one channel established between the transmitter and the receiver;
calculating a decoding matrix from an eigenvalue decomposition of the intermediate matrix; and
decoding, according to the code, to produce decoded symbols by multiplying the received symbols received by the receiver over the at least one channel by the decoding matrix.

21. A device for decoding symbols received by a receiver provided with at least one receiving antenna, the symbols being transmitted by one transmitter provided with at least two transmitting antennas through at least one channel in a telecommunication system, the device comprising:
an obtaining section configured to obtain an intermediate matrix by calculating at least a Kronecker product of an identity matrix of size N, where the size N is a time and/or a frequency dimension of a code, and an estimated correlation matrix of a response of the at least one channel established between the transmitter and the receiver;
a calculating section configured to calculate a decoding matrix from an eigenvalue decomposition of the intermediate matrix; and
a decoding section configured to produce decoded symbols according to the code by multiplying received symbols received from the transmitter over the at least one channel by the decoding matrix.

22. A computer readable medium storing instructions executable by a processor to perform a method for transmitting symbols through at least one channel in a telecommunication system including at least one transmitter provided with at least two transmitting antennas and at least one receiver provided with at least one receiving antenna, the method comprising:

obtaining an intermediate matrix by calculating at least a Kronecker product of an identity matrix of size N, where the size N is a time and/or a frequency dimension of a code, and an estimated correlation matrix of a response of the at least one channel established between the transmitter and the receiver;

calculating a coding matrix from an eigenvalue decomposition of the intermediate matrix; and encoding, according to the code, to produce coded symbols to be transmitted over the at least one channel established between the transmitter and the receiver by multiplying a vector comprising the symbols by the coding matrix.

23. A computer readable medium storing instructions executable by a processor to perform a method for decoding symbols received by a receiver provided with at least one receiving antenna, the symbols being transmitted by a transmitter provided with at least two transmitting antennas through at least one channel in a telecommunication system, the method comprising:

obtaining an intermediate matrix by calculating at least a Kronecker product of an identity matrix of size N, where the size N is a time and/or a frequency dimension of a code, and an estimated correlation matrix of a response of the at least one channel established between the transmitter and the receiver;

calculating a decoding matrix from an eigenvalue decomposition of the intermediate matrix; and decoding, according to the code, to produce decoded symbols by multiplying the received symbols received by the receiver over the at least one channel by the decoding matrix.

* * * * *

UNITED STATES PATENT AND TRADEMARK OFFICE
CERTIFICATE OF CORRECTION

| | | |
|---|---|---|
| PATENT NO. | : 7,672,389 B2 | Page 1 of 1 |
| APPLICATION NO. | : 11/435743 | |
| DATED | : March 2, 2010 | |
| INVENTOR(S) | : Gueguen | |

It is certified that error appears in the above-identified patent and that said Letters Patent is hereby corrected as shown below:

On the title page, Item (30), the Foreign Application Priority Data is incorrect. Item (30) should read:

-- (30)    Foreign Application Priority Data

May 25, 2005    (EP).................................. 05291127 --

Signed and Sealed this

Fifteenth Day of June, 2010

David J. Kappos
*Director of the United States Patent and Trademark Office*